(No Model.)  6 Sheets—Sheet 1.

H. C. WEBB.
MACHINE GUN.

No. 569,899. Patented Oct. 20, 1896.

WITNESSES:
Donn Turtchell
C. R. Ferguson

INVENTOR
H. C. Webb
BY
Munn & Co
ATTORNEYS.

(No Model.) 6 Sheets—Sheet 2.

H. C. WEBB.
MACHINE GUN.

No. 569,899. Patented Oct. 20, 1896.

WITNESSES:
Donn Twitchell
C. R. Ferguson

INVENTOR
H. C. Webb.
BY Munn & Co.
ATTORNEYS.

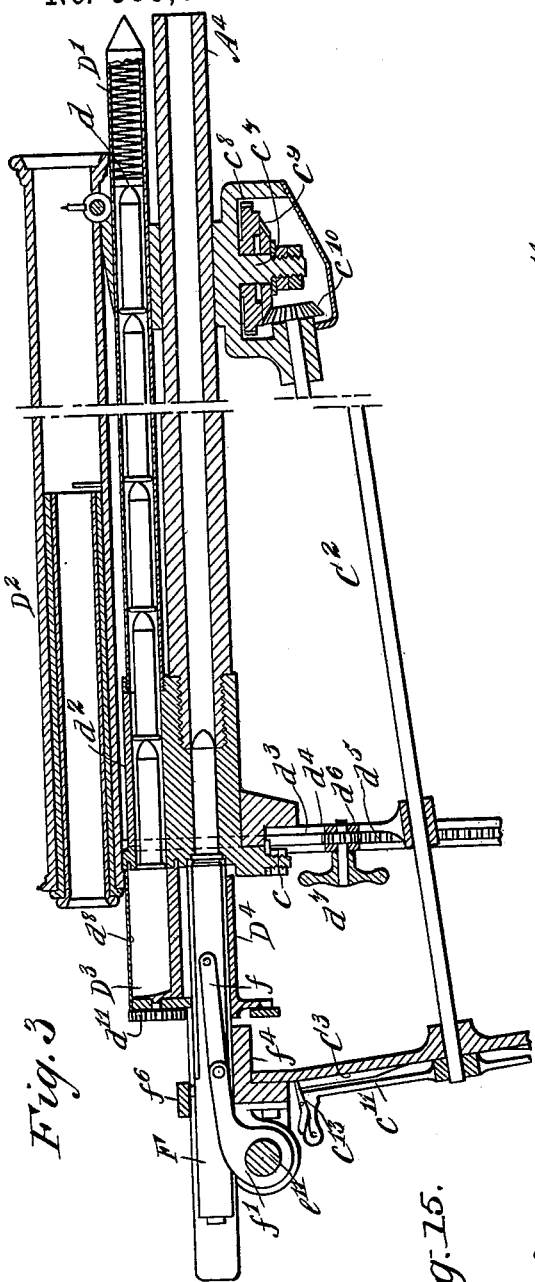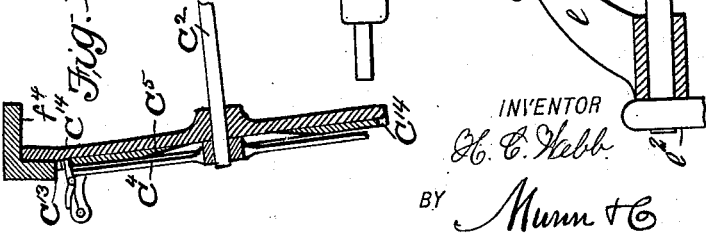

(No Model.) 6 Sheets—Sheet 4.

H. C. WEBB.
MACHINE GUN.

No. 569,899. Patented Oct. 20, 1896.

WITNESSES:
Donn Twitchell
C. R. Ferguson

INVENTOR
H. C. Webb.
BY Munn & Co.
ATTORNEYS.

(No Model.) 6 Sheets—Sheet 5.
H. C. WEBB.
MACHINE GUN.
No. 569,899. Patented Oct. 20, 1896.
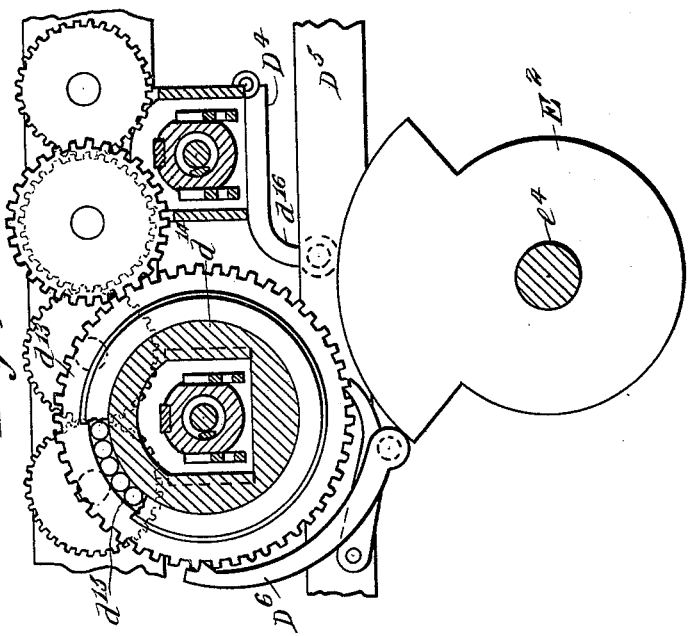
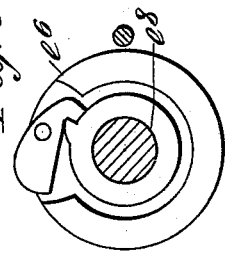
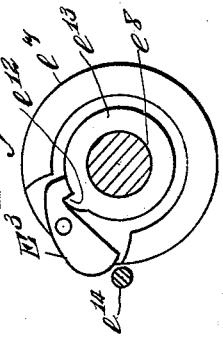
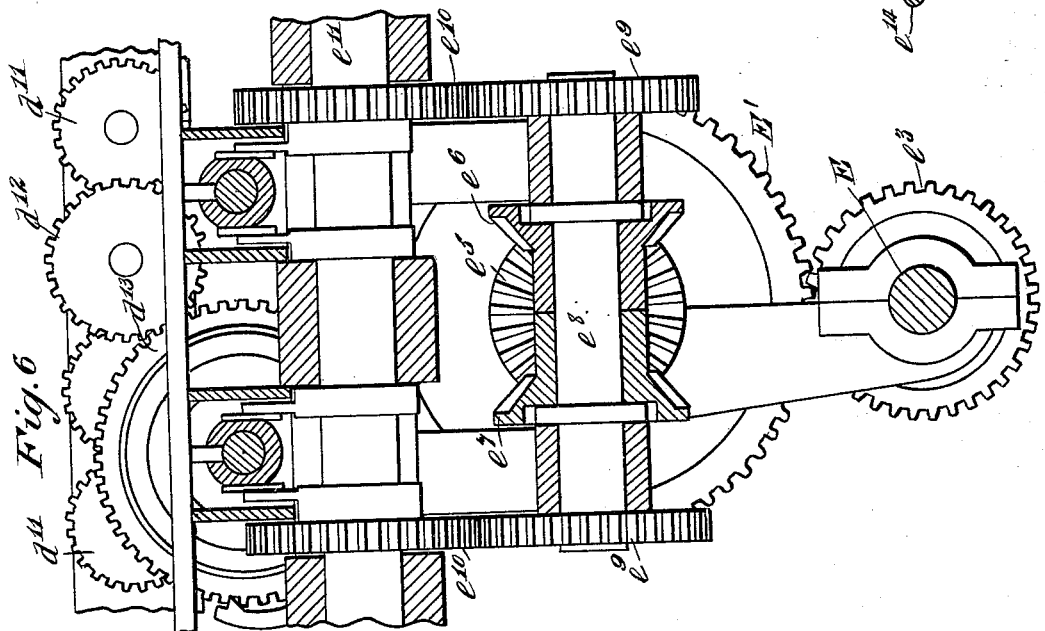
WITNESSES:
Donn Twitchell
C. R. Ferguson
INVENTOR
H. C. Webb.
BY Munn & Co
ATTORNEYS.

(No Model.) 6 Sheets—Sheet 6.
H. C. WEBB.
MACHINE GUN.
No. 569,899. Patented Oct. 20, 1896.
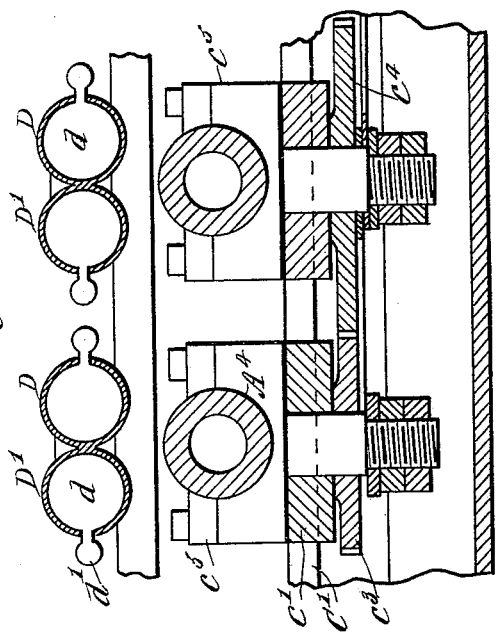
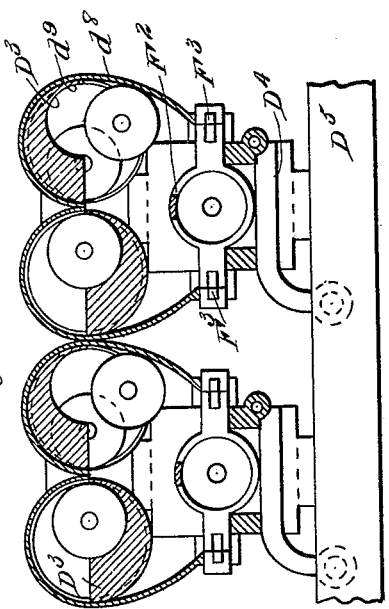
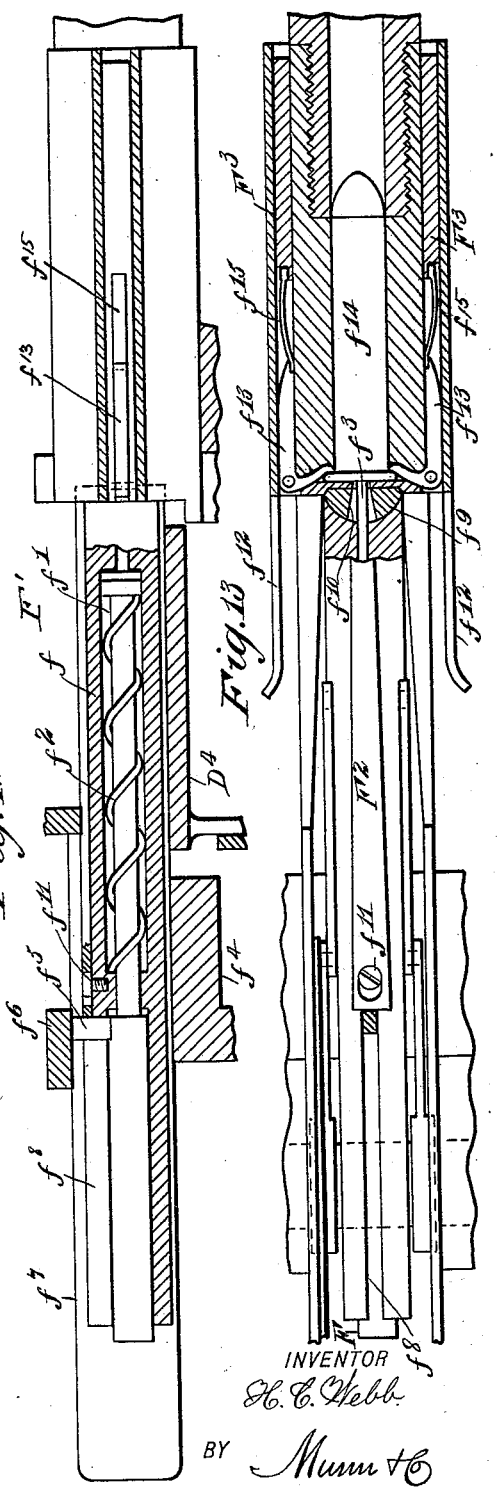
WITNESSES:
Donn Twitchell
C. R. Ferguson
INVENTOR
H. C. Webb.
BY Munn & Co
ATTORNEYS.

UNITED STATES PATENT OFFICE.

HARRY C. WEBB, OF TACOMA, WASHINGTON.

MACHINE-GUN.

SPECIFICATION forming part of Letters Patent No. 569,899, dated October 20, 1896.

Application filed August 19, 1895. Serial No. 559,770. (No model.)

*To all whom it may concern:*

Be it known that I, HARRY C. WEBB, of Tacoma, in the county of Pierce and State of Washington, have invented new and useful Improvements in Machine or Magazine Guns, of which the following is a full, clear, and exact description.

This invention relates to rapid-firing magazine-guns, and it comprises a series of guns arranged in pairs and means for alternately loading and firing the same.

I will describe a machine-gun embodying my invention, and then point out the novel features in the appended claims.

Reference is to be had to the accompanying drawings, forming a part of this specification, in which similar characters of reference indicate corresponding parts in all the views.

Figure 1:
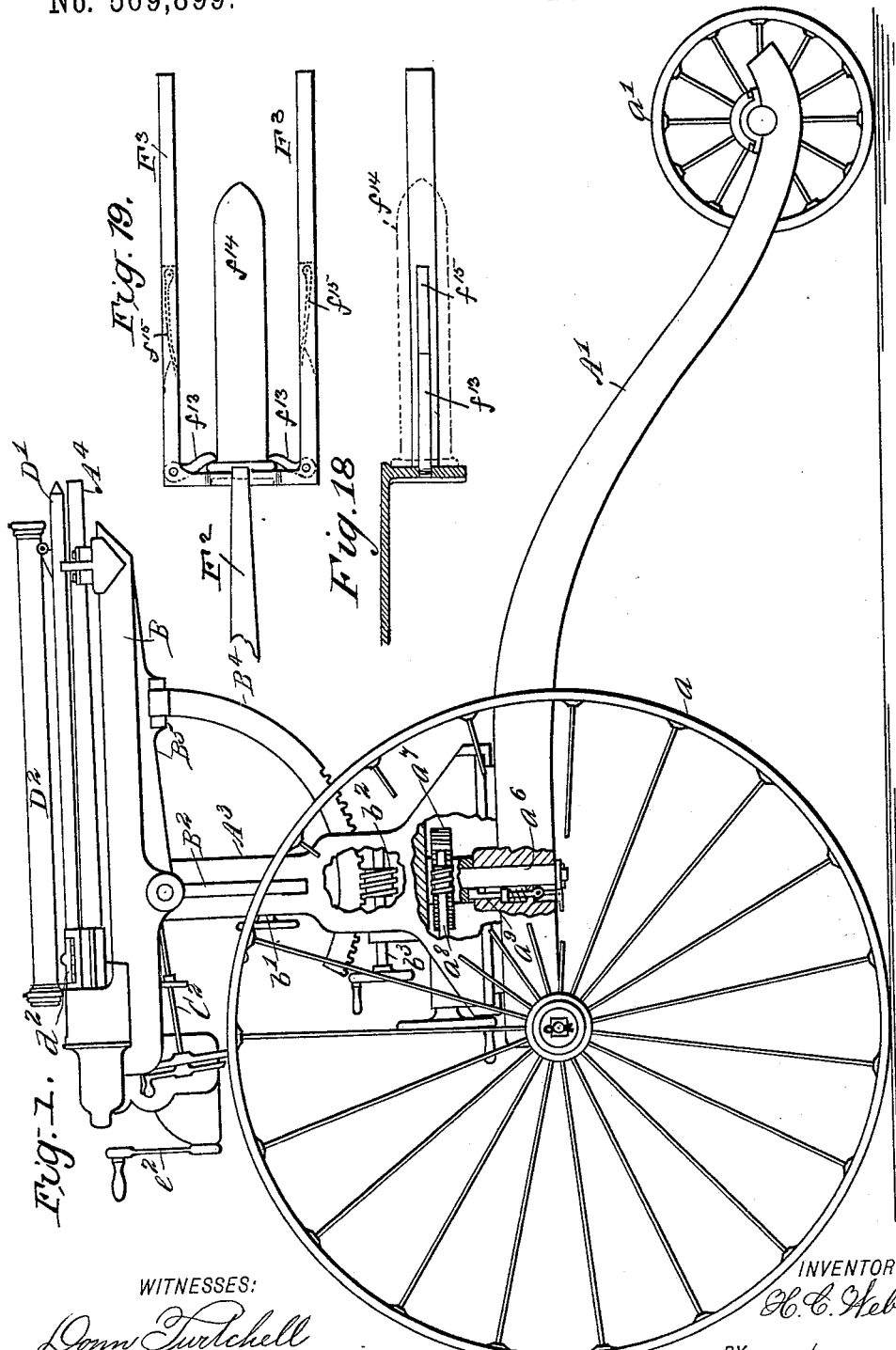
Figure 2:
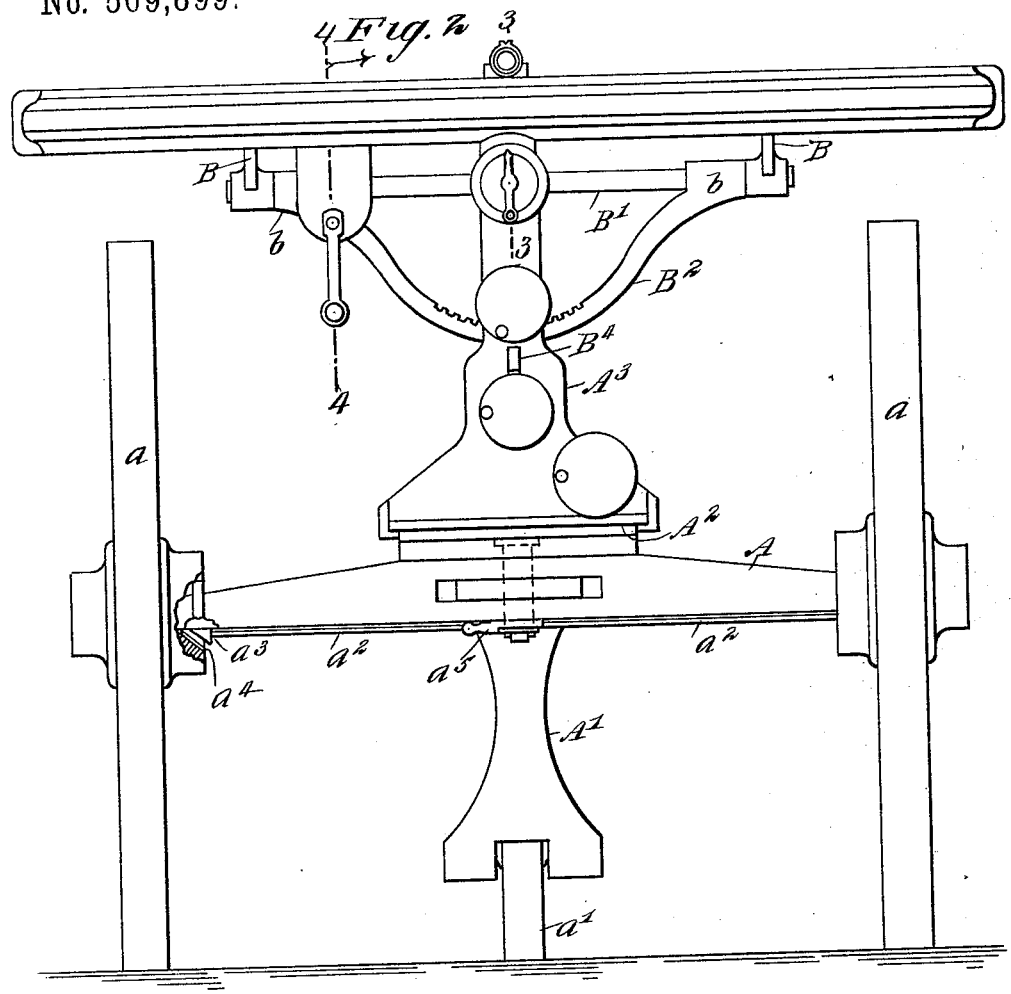
Figure 16:
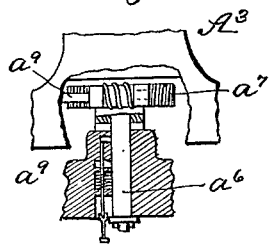
Figure 14:
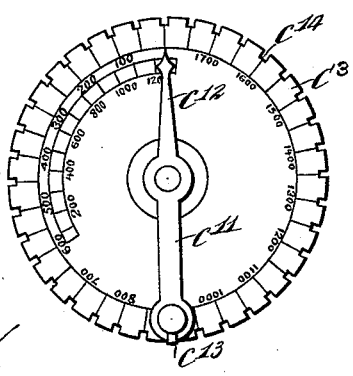
Figure 17:
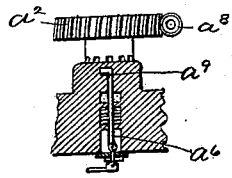
Figure 5:
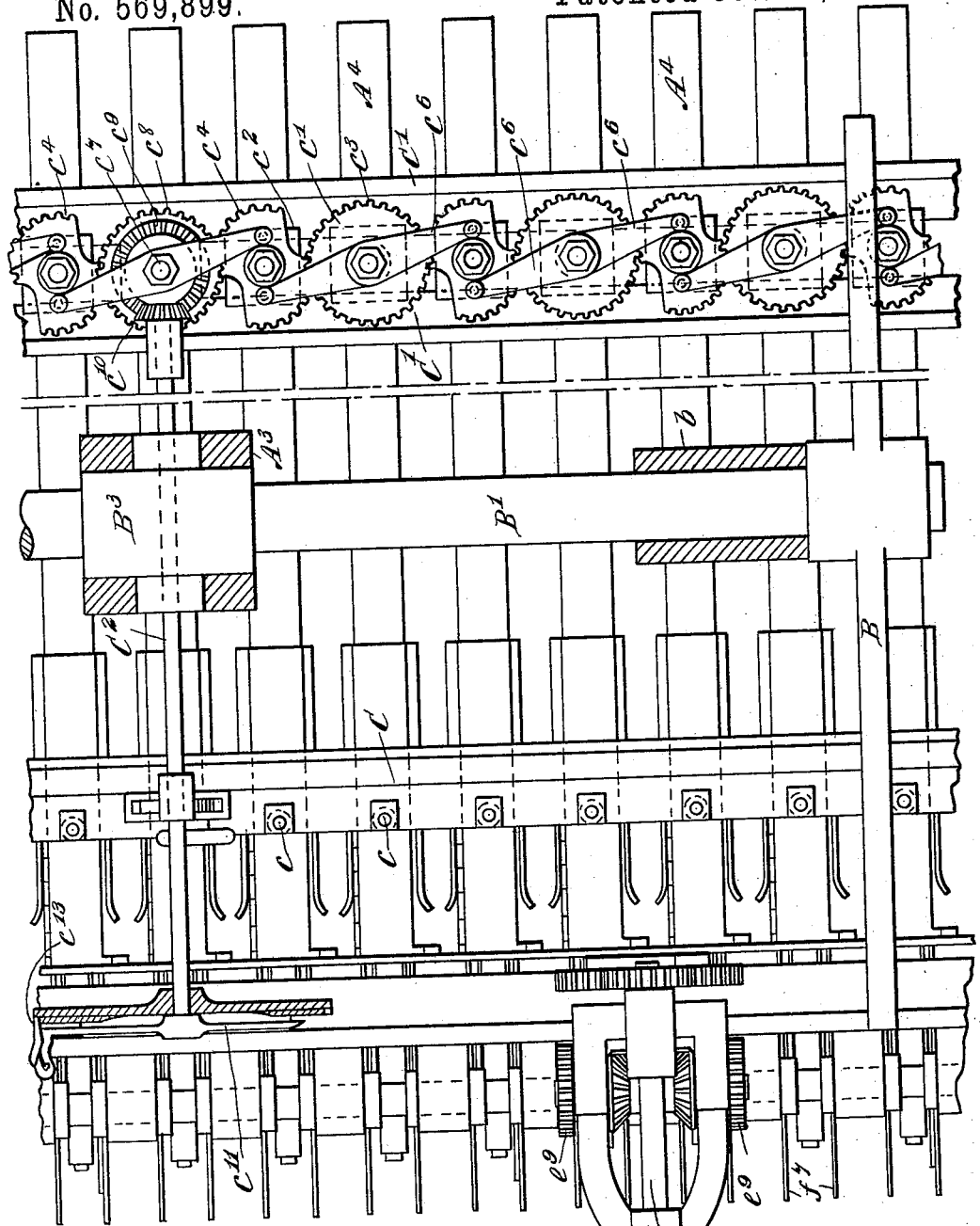

Figure 1 is a side elevation of a machine-gun embodying my invention. Fig. 2 is a rear elevation thereof. Fig. 3 is a vertical longitudinal section on the line 3 3 in Fig. 2 with certain parts omitted. Fig. 4 is a partial elevation and a partial section on the line 4 4 in Fig. 2. Fig. 5 is a bottom plan view of the series of guns, showing certain mechanism for operating the same. Fig. 6 is a vertical section, on an enlarged scale, on the line 6 6 of Fig. 4. Fig. 7 is a section on the line 7 7 of Fig. 4. Figs. 8 and 9 are face views of parts employed in loading the guns. Fig. 10 is a section on the line 10 10 of Fig. 4. Fig. 11 is a section on the line 11 11 of Fig. 4. Fig. 12 is a vertical longitudinal section of firing mechanism employed. Fig. 13 is a partial plan and partial section showing an extractor for empty shells. Fig. 14 is a face view of a register or gage for indicating the degree of lateral deflection of the guns to concentrate or diverge the bullets discharged. Fig. 15 is a vertical section thereof. Fig. 16 is a sectional elevation of a worm-gear and locking mechanism employed. Fig. 17 is another view thereof, showing the parts in another position. Fig. 18 is a partial section and partial elevation of a shell-extractor, and Fig. 19 is a plan view thereof.

Referring to the drawings, A designates the axle, supported by the wheels $a$, and from which the stock A' extends forward, the end of said stock being supported by a trail-wheel $a'$. I provide a locking device for the wheels $a$, which, as here shown, consists of rods $a^2$, extended along the under side of the axle A, and each rod has at its outer end a wedge-shaped block $a^3$, adapted to engage in one of a series of notches $a^4$, formed in the inner end of the wheel-hub. At their inner adjacent ends the rods $a^2$ are pivotally connected to a pivoted operating-lever $a^5$. By manipulating the lever $a^5$ the rods may be moved longitudinally to lock or release the wheels.

On the stock A' is mounted a circular plate A², upon which is mounted to rotate a pillar A³, which supports the series of guns A⁴ and their operating parts. The pillar A³ has a vertical shaft or bolt A⁶ depending from it and extended through an opening in the stock A'. A worm-wheel $a^7$ is loosely mounted on the bolt $a^6$, and a worm on a worm-shaft $a^8$ engages with the worm-wheel. The wheel $a^7$ may be locked to remain stationary by means of a spring-controlled latch $a^9$ engaging in a notch formed in the hub of the worm-wheel. When in this locked position, the pillar A³ may be rotated by the worm-shaft traveling around the wheel, but if a quicker motion be desired the latch $a^9$ must be withdrawn from the worm-wheel and then the pillar may be rotated by hand.

B designates longitudinally-extended supporting-bars for the guns. These bars are rigidly secured intermediate of their ends to a rock-shaft B', which passes loosely through sleeves $b$ on the ends of a curved rack-bar B², and the rock-shaft also passes loosely through a block B³, having trunnion-bearings in the upper portion of the pillar A³, as shown in Fig. 5. The central rack portion of the bar B² passes transversely through an opening in the pillar A³ and is engaged by a worm on a worm-shaft $b'$. By this mechanism the series of guns may be turned and secured on a level plane should the pillar, owing to uneven ground, be on an angle.

A curved rack-bar B⁴ is pivotally connected at one end to a frame-bar B⁵, and its rack is engaged by a worm $b^2$ on a worm-shaft $b^3$, and by means of this mechanism the elevation of the guns may be regulated and secured.

There may be any number of guns A⁴ arranged in a series, and a main feature of my invention resides in means for shifting the muzzles of the guns relatively to the central gun, which is fixed, whereby the bullets discharged may be centralized or caused to strike in substantially the same line at any required distance. Each gun of the series, excepting the central gun, has a pivotal connection $c$ with a transverse bar C, supported by the arms or bars B.

To the forward ends of the arms B are attached guideways C", and within these guideways are movable blocks $c'$ $c^2$, and on studs depending from these blocks $c'$ $c^2$ are pivoted gear-wheels $c^3$ and segmental gears $c^4$. The blocks $c'$ have upward extensions $c^5$, adapted to engage loosely around the gun-barrels, as indicated in Fig. 11, so that said gun-barrels may slide in the blocks during the operation of swinging the guns on their pivots. From the pivotal stud of each gear-wheel $c^3$ arms $c^6$ extend to pivotal connections with the segmental gears $c^4$, these pivotal connections being at opposite sides of the stud upon which the segmental gear is mounted.

From the bridge portion of the guideways C", underneath the central gun of the series, a stud $c^7$ extends downward and has mounted upon it a gear-wheel $c^8$, meshing with the segmental gear $c^4$ at its opposite side, and to the said gear $c^8$ is secured a bevel-gear $c^9$, engaging with a bevel-gear $c^{10}$, secured to a shaft $C^2$, extended longitudinally of the central gun through suitable hangers or bearings, and having at its outer end a crank $c^{11}$, which is provided with a pointer $c^{12}$, movable over a dial $C^3$, attached to the rear portion of the gun-frame. The crank $c^{11}$ is provided at its end with a spring-controlled dog $c^{13}$, adapted to engage in any one of the series of notches $c^{14}$ in the periphery of the disk $C^3$, so as to secure the gun at the required adjustment.

The disk $C^3$ is provided with a row of figures ranging from one hundred to seventeen hundred which may indicate yards, and is also provided with a segmental row of figures reading to the right and ranging from two hundred yards to twelve hundred yards. In the operation of this mechanism, and assuming that all the bullets from the several guns are to be concentrated or aimed at a point at a distance of two hundred yards, the crank $c^{11}$ is rotated to turn the pointer $c^{12}$ to the left and in register with the mark "200" on the disk. This swings the muzzles of the several guns inward or toward the central fixed gun. If it is desired to diverge the several shots, the crank is turned in the opposite direction and the pointer $c^{12}$ rotated to register with the desired number of yards indicated in the inner row of figures on the disk.

Each gun $A^4$ is provided with two magazines D D'. These magazines are attached to the upper side of the gun, and each one is provided with a spring-impelled follower $d$, and each follower $d$ has a finger-piece $d'$ extended outward through a longitudinal slot in the magazine, so that the plunger may be pushed forward by hand against the resistance of the spring when it is desired to place cartridges in the magazine, the cartridges being placed therein through an opening normally closed by a door or cover $d^2$.

Between the magazines for the central gun is mounted a telescopic sight $D^2$, which, as here shown, is pivoted at its forward end to said magazines, and at its rear end is attached to a bar $d^3$, movable in guideways $d^4$, and having a rack portion $d^5$ engaged by a pinion $d^6$, that may be rotated by means of a hand-piece $d^7$ to elevate or lower the rear end of the telescopic sight in accordance with the distance from the gun of the object aimed at. The telescopic sight may be provided on its top with the ordinary open sight. At the rear end of each magazine is a rotary loading-block $D^3$, designed to receive cartridges from the magazine and deposit the same in a chamber arranged rearward of and communicating with the breech of the gun. Each block $D^3$ rotates in a chamber $d^8$, communicating with its magazine and located directly over the receiving-chamber of the gun. Each block $D^3$ has a longitudinal channel or groove $d^9$ arranged at one side of the longitudinal center or axis of the block, and each block has a bearing extended through the outer end of the chamber, and upon this bearing is mounted a gear-wheel $d^{11}$. The gear-wheels $d^{11}$ of the several blocks intermesh one with another, and to the shaft of one of them is attached a gear-wheel $d^{12}$, meshing with a master-gear $d^{13}$. This master-gear $d^{13}$ is mounted on a fixed part $d^{14}$, surrounding a plunger to be hereinafter described, and preferably the part $d^{14}$ is provided with an annular groove or channel within which ball-bearings $d^{15}$ are placed, and upon which the master-gear $d^{13}$ revolves.

The lower portion of each gun, or the chamber in the rear thereof, is provided with an opening through which exploded shells may be ejected, and this opening is provided with a hinged door $D^4$, which has an arm $d^{16}$ extended to a pivotal connection with a transversely-reciprocating bar $D^5$, and upon this bar $D^5$ is pivotally mounted a dog $D^6$, engaging at its free end with the teeth of the master-gear $d^{13}$.

E is a shaft mounted in hangers $e$ $e'$, having a crank $e^2$ at its outer end and provided at its inner end with a pinion $e^3$, meshing with a gear-wheel E', mounted on a shaft $e^4$, extended parallel with the shaft E, and having at its outer end a bevel gear-wheel $e^5$, which meshes with bevel-gears $e^6$ $e^7$, loosely mounted on a transverse shaft $e^8$, having at its end gear-wheels $e^9$, engaging with gear-wheels $e^{10}$ on a shaft $e^{11}$, extended parallel with the shaft $e^8$. On the shaft $e^4$, adjacent to the gear-wheel E', is mounted a cam $E^2$, adapted to engage with the pivoted end of the dog $D^6$ and move the bar $D^5$ longitudinally, and also move the dog $D^6$ to give a partial rotation to the master-gear $d^{13}$, thus operating the several rotary loading devices $D^3$. Upon the return movement, by gravity, of the bar $D^5$ the door $D^4$ will open by gravity and the weight of the bar $D^5$ and allow an exploded shell to drop through the opening to the ground.

As before stated, the bevel-gears $e^6$ $e^7$ are loosely mounted on the shaft $e^8$, but there is a clutch mechanism arranged between each bevel-gear and the shaft $e^8$. This clutch mechanism is plainly shown in Figs. 8 and 9, and each clutch comprises a dog $E^3$, pivotally connected to its pivotal gear and adapted at a certain point of rotation to engage with a lug $e^{12}$, extended laterally from a collar $e^{13}$, rigidly attached to the shaft $e^8$. The dog $E^3$ has a cam-shaped outer end adapted to contact with a fixed pin $e^{14}$, whereby the said dog may be thrown out of engagement with the projection $e^{12}$ on the collar $e^{13}$. In the operation of these parts one turn of the gear-wheel $E'$ will turn the gears $e^6$ $e^7$ in opposite directions, and these gears, through their clutch mechanism, will alternately rotate the shaft $e^8$ in opposite directions and consequently rotate the shaft $e^{11}$ alternately in opposite directions, and during the time the shaft $e^8$ is stationary the cam $E^2$ operates the magazine mechanism.

I will now describe the loading, extracting, and firing mechanism employed, it being understood that such a mechanism is employed with each gun.

F is a plunger movable through the breech portion of the gun, and this plunger has a link connection $f$ with an arm $f'$, rigidly mounted on the shaft $e^{11}$. Obviously as this shaft is rocked back and forth by the gear mechanism heretofore described the plunger will be correspondingly reciprocated to either force a cartridge into position in the breech of the gun or to extract an exploded shell therefrom. The plunger F is tubular and a spring-impelled plunger-rod $F'$ is located therein and is adapted, under the force of the spring $f^2$, to contact with a firing-pin $f^3$, adapted to strike against the cap of a cartridge and explode the same. The several plungers F are supported on the cross-bar $f^4$, and to insure the firing of the several guns simultaneously the several plunger-rods $F'$ have connections $f^5$ to the transverse bar $f^6$, movable over guideways $f^7$, between which the plungers F move. The connections $f^5$ extend through longitudinal slots $f^8$ in the upper side of the plungers F. The several plungers do not turn laterally in accordance with the movement of the breech of the guns, and to provide for this movement of the guns relative to the plungers I provide the end of each plunger with a semicylindrical depression, within which fits a similarly-shaped breech-block $f^9$, having a funnel-shaped opening $f^{10}$, through which the firing-pin $f^3$ extends.

An arm $F^2$ has a lost motion pivotal connection $f^{11}$ with the plunger F. This arm $F^2$ at its end opposite its pivotal point is attached to extractor-bars $F^3$, movable in guideways $f^{12}$, arranged at the side of the breech of the gun, as plainly indicated in Fig. 13, and each extractor-bar $F^3$ is provided at its end with a pivoted dog $f^{13}$, adapted to engage at one end with a flange of the cartridge $f^{14}$. As the plunger is moved rearward the arm $F^2$ is of course moved in the same direction, and this draws the extractor-bars $F^3$ outward, causing the dogs $f^{13}$ to extract the exploded shell of a cartridge, and when the inner ends of said dogs $f^{13}$ shall have passed beyond the outer ends of the guideways $f^{12}$ springs $f^{15}$ on the bars $F^3$ and engaging with the inner ends of the dogs $f^{13}$ will rock said dogs on their pivots and disengage them from the shell, which is allowed to drop through the opening in the breech normally closed by the door $D^4$.

To a guide $f^7$ for each plunger F is pivotally connected a sear G, which near its pivotal point has a lug adapted to engage with the front side of the bar $f^6$, and it is held yieldingly in such engagement by a spring $g$. At its forward end the sear has a pin $g'$ extended through a slot $g^2$ in the guide and adapted to be engaged by the arm $f'$ during its downward movement, which will rock the sear on its pivot and release the bar $f^6$, so that the plunger-rod $F'$ may be forced forward by its spring to discharge the cartridge in the gun. Obviously as the several sears are simultaneously operated the several guns will be simultaneously discharged.

Having thus described my invention, I claim as new and desire to secure by Letters Patent—

1. The combination, with a series of gun-barrels having pivotal connection with a support upon which they may be swung in a horizontal plane, of means for causing said movement, comprising a gear-wheel carried by each barrel, segmental gears engaging with adjacent gears, an operating-shaft for said gears, a dial or disk having distance-indicating marks thereon, and a pointer carried by the operating-shaft and movable over said marks, substantially as specified.

2. The combination with a central fixed gun-barrel, of a series of barrels arranged at each side thereof and adapted to swing in a horizontal plane, a gear-wheel rotatively mounted on a stud extended from said fixed barrel, a guideway extended transversely of the barrels, gear-wheels supported by said swinging barrels, the said gear-wheels having sliding connection with the guideway, segmental gears having a sliding connection with said guideway and adapted to transmit motion from the gear-wheel on the fixed barrel to the gear-wheels on the swinging barrel, and means for rotating the gear-wheel on the fixed barrel, substantially as specified.

3. The combination, with a series of gun-barrels adapted to swing in a horizontal plane, of mechanism substantially as shown and described, for causing said swinging movement, a pointer, and a numbered dial over which said pointer is movable to indicate the lateral deflection of said swinging barrels, as specified.

4. In a machine-gun, the combination with a barrel, of a pair of magazines mounted thereon, a rotary loading device in the rear end of each magazine, and mechanism for alternately operating said loading devices for transferring a cartridge from the magazines to the barrels, substantially as specified.

5. In a machine-gun, the combination with a series of barrels, of a pair of magazines for each of said barrels, mechanism for transferring a cartridge from said magazines alternately to a barrel, and mechanism operating simultaneously therewith for extracting an exploded shell from the barrel, substantially as specified.

6. The combination with a series of gun-barrels, of a pair of magazines for each of said barrels, a rotary loading device in the rear end of each of said magazines, mechanism for operating said devices to load a barrel alternately from said magazines, and a firing mechanism operated by the mechanism for operating the loading devices, substantially as specified.

7. The combination with a barrel, of a plunger movable in guideways extended rearward from said barrel, a plunger-rod movable within said plunger, a firing-pin adapted to be pushed forward by said plunger, a spring for moving the said plunger-rod forward, a rotary shaft, a connection between said rotary shaft and the plunger, a sear for retaining the plunger-rod in its rearward position, the said sear being operated by the connection between the rotary shaft and the plunger, and alternately-loading devices on the barrel substantially as specified.

8. The combination, with a series of gun-barrels arranged in a horizontal plane and a magazine on each barrel, of a loading mechanism for each barrel, comprising a plunger movable in guideways extended rearward from the barrel, a firing-plunger movable within each plunger, mechanism for moving the several plungers in unison, mechanism for simultaneously releasing the several firing-plungers, and a shell-extractor, carried by each plunger, substantially as specified.

9. The combination with a gun-barrel, of a loading-plunger movable longitudinally in guideways rearward of said gun-barrel, a firing-plunger movable longitudinally within the said plunger, mechanism for operating each of said plungers, an arm having a lost-motion connection with the loading-plunger, and a shell-extractor connected with the said arm, substantially as specified.

10. The combination with a gun-barrel, of a loading-plunger movable in guideways extended rearward from said gun-barrel, a firing-plunger movable in the first-named plunger, mechanism for operating each of said plungers, an arm having a lost-motion connection with the loading-plunger, an extractor attached to said arm and comprising pivoted dogs adapted to engage with the flange of a cartridge-shell, rods to which said dogs are pivoted, and guideways extended at the sides of the gun-barrel through which said rods are movable, substantially as specified.

11. The combination with a series of gun-barrels, of a lateral deflecting-gage comprising a disk having a series of distance-indicating numbers thereon arranged to read from left to right and another series of distance-indicating figures arranged to read from right to left, a pointer movable over said disk, and means connected with said pointer for causing the lateral deflections of the gun-barrels, substantially as specified.

12. The combination, with a series of gun-barrels arranged in a horizontal plane, of a pair of magazines for each barrel, a rotary loading device in each magazine, intermeshing gear-wheels for rotating all of said loading devices, a master-gear for imparting motion to said gear-wheels, a transversely-reciprocating bar, a dog carried by said bar and engaging with the master-gear, and a cam for imparting motion to said bar to transmit rotary motion to the several gears, substantially as specified.

13. The combination, with a series of gun-barrels arranged in a horizontal plane, of a pair of magazines for each of said barrels, rotary loading devices in the rear end of each of said magazines, a gear-wheel having connection with each rotary loading device, a master-gear for transmitting motion to said gear-wheels, a transversely-movable bar, mechanism between said bar and master-gear for imparting rotary motion to the master-gear, a cam for moving said bar, a door-closed opening in the breech of each barrel, and a connection between each door and said transversely-moving bar whereby all of said doors may be opened and closed simultaneously by the movement of the said bar, substantially as specified.

14. The combination with the supporting-axle and the stock, of a rotary pillar mounted on said stock for supporting a series of gun-barrels, an extension projected downward from said pillar, a worm-wheel loosely mounted on said extension, a worm-shaft having its worm engaging the said worm-wheel, and a locking device for locking and releasing the said worm-wheel, substantially as specified.

HARRY C. WEBB.

Witnesses:
JNO. P. REED,
C. A. STOKES.